United States Patent
Senniappan et al.

(10) Patent No.: US 9,444,689 B2
(45) Date of Patent: Sep. 13, 2016

(54) DYNAMICALLY MIGRATING VIRTUAL MACHINES AND GATEWAYS

(71) Applicant: Microsoft Technology Licensing LLC, Redmond, WA (US)

(72) Inventors: Pradeep Senniappan, Redmond, WA (US); Uladzimir V. Raikou, Kirkland, WA (US); Natalia Valeryevna Varava, Bellevue, WA (US); Gregory M. Cusanza, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 375 days.

(21) Appl. No.: 13/920,884

(22) Filed: Jun. 18, 2013

(65) Prior Publication Data

US 2014/0359091 A1 Dec. 4, 2014

Related U.S. Application Data

(60) Provisional application No. 61/830,522, filed on Jun. 3, 2013.

(51) Int. Cl.
- *G06F 15/173* (2006.01)
- *H04L 12/24* (2006.01)
- *G06F 9/48* (2006.01)
- *G06F 9/455* (2006.01)

(52) U.S. Cl.
CPC ............. *H04L 41/12* (2013.01); *G06F 9/4856* (2013.01); *G06F 2009/4557* (2013.01)

(58) Field of Classification Search
CPC ....................... G06F 2009/4557; G06F 9/4856
USPC ........................................ 709/220–224, 226
See application file for complete search history.

(56) References Cited

U.S. PATENT DOCUMENTS

| | | | |
|---|---|---|---|
| 8,102,781 B2 | 1/2012 | Smith | |
| 8,145,737 B2* | 3/2012 | Nedelcu et al. | 709/223 |
| 8,276,140 B1 | 9/2012 | Beda, III et al. | |
| 2004/0117476 A1* | 6/2004 | Steele | G06F 9/5083 709/224 |
| 2009/0204826 A1* | 8/2009 | Cox et al. | 713/320 |
| 2012/0054346 A1 | 3/2012 | Lee et al. | |
| 2013/0081047 A1 | 3/2013 | Frey et al. | |
| 2013/0182605 A1* | 7/2013 | So et al. | 370/254 |

OTHER PUBLICATIONS

"It's Time to Virtualize the Network", Retrieved on: May 3, 2013, Available at: http://nicira.com/sites/default/files/docs/It%20is%20Time%20To%20Virtualize%20the%20Network%20White%20Paper_2.pdf.

(Continued)

*Primary Examiner* — Wing F Chan
*Assistant Examiner* — Joseph Maniwang
(74) *Attorney, Agent, or Firm* — Henry Gabryjelski; Doug Barker; Micky Minhas

(57) ABSTRACT

Improving a distributed network environment. A method includes determining physical element properties of physical elements in a virtualized network topology. The method further includes determining gateway placement on a first physical element of the virtualized network topology. The method further includes determining utilization of physical elements in the virtualized network topology. Based on the physical element properties, gateway placement, and utilization of physical elements in the virtualized network topology, the method further includes determining an improved virtualized network topology to improve use of physical elements in the virtualized network topology.

21 Claims, 2 Drawing Sheets

(56) References Cited

OTHER PUBLICATIONS

"Cisco Virtualized Workload Mobility Design Considerations", Retrieved on: May 3, 2013, Available at: http://www.cisco.com/en/US/docs/solutions/Enterprise/Data_Center/DCI/4.0/EMC/EMC_2.pdf.

"FlexFabric", Retrieved on: May 2, 2013, Available at: http://h17007.www1.hp.com/us/en/whatsnew/august/230811-2.aspx.

"Virtualized Services Platform", Retrieved on: May 3, 2013, Available at: http://www.nuagenetworks.net/wp-content/uploads/2013/03/2013-03-28_Nuage_DS_r3.pdf.

* cited by examiner

DYNAMICALLY MIGRATING VIRTUAL MACHINES AND GATEWAYS

CROSS-REFERENCE TO RELATED APPLICATIONS

This application claims the benefit of U.S. Provisional application 61/830,522 filed Jun. 3, 2013, titled "DYNAMICALLY MIGRATING VIRTUAL MACHINES AND GATEWAYS", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

So called "cloud" computing systems implement virtual machines on physical hardware. The virtual machines function as if they were actual physical machines, but can be implemented using abstractions applied to physical hardware. Virtual machines can be networked together in a cloud system. However, for the virtual machines to communicate with external machines, storage, or other systems, the virtual machines communicate through a gateway.

With network virtualizations technologies like HyperV network virtualization available from Microsoft Corporation of Redmond Wash., the location of physical hardware in a datacenter implementing virtual networks no longer constrains deployment of virtual machines to specific hardware. Rather, a virtualized network can be built using various physical elements of the physical datacenter network infrastructure, which allows virtual machines to be deployed anywhere in the datacenter, even when the various physical elements are located in different physical locations. But such deployments can cause non-optimal network utilization within a datacenter network if the communication between virtual machines results in use of a long or complex network path. Additionally, gateways connecting the virtual machines to external networks or devices, that are implemented on physical elements in the network that result in longer or more complex network paths between virtual machines within a virtualized environment, can result in further overhead.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a virtualized networking environment. The method includes acts for improving the network environment. The method includes determining physical element properties of physical elements in a virtualized network topology. The method further includes determining gateway placement on a first physical element of the virtualized network topology. The method further includes determining utilization of physical elements in the virtualized network topology. Based on the physical element properties, gateway placement, and utilization of physical elements in the virtualized network topology, the method further includes determining an improved virtualized network topology to improve use of physical elements in the virtualized network topology.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may create improved virtual network topologies of a datacenter with respect to physical elements (i.e. hardware) used to create virtual network topologies. This may be done by migrating virtual machines and/or dynamically configuring the gateway used by the virtual machines, based on physical infrastructure utilization. Virtual machines communicate with external machines, storage, or other systems external to a virtual machine virtual network topology through a gateway. In this way, embodiments can group virtual machines and routing devices (i.e. gateways) used by virtual machines to be close to each other. By gathering datacenter physical network utilization, embodiments can create virtual machine groups and position gateways to balance network load across a virtual network topology and to reduce or eliminate excessive traffic. When such network improvement is restricted because of deficiencies in other resources (such as available CPU or storage capacity in some part of the datacenter), network virtualization allows embodiments to still function, but recommendations regarding what resources and location(s) to add resources can be provided to datacenter administrators to improve utilization.

Figure 1:
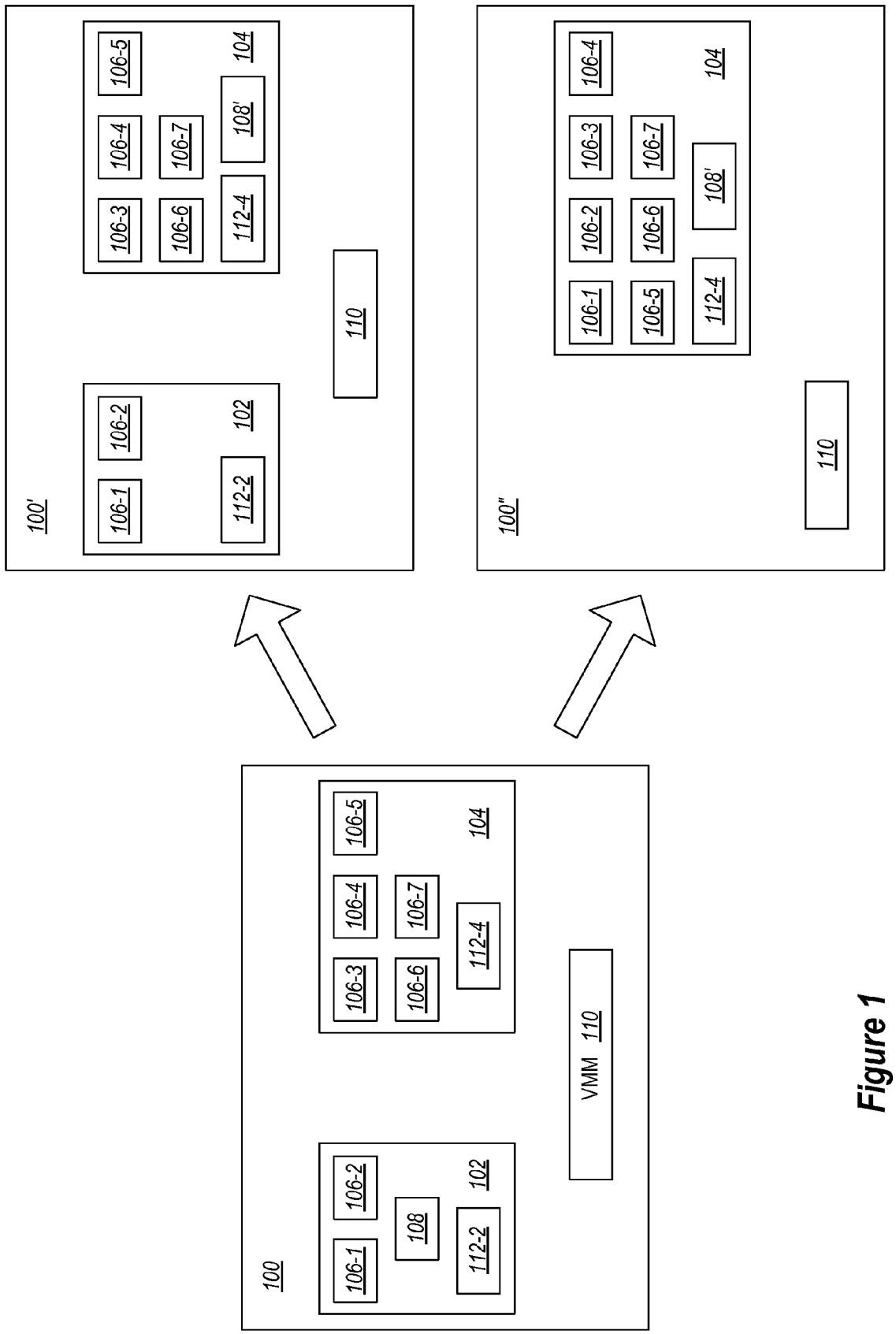
FIG. 1 illustrates transformation of a virtualized network topology.

Referring now to FIG. 1, an example is illustrated. FIG. 1 illustrates a datacenter 100. The datacenter 100 is shown as being implemented in two different physical locations 102 and 104. Each of the locations has physical hardware used to implement a part of the datacenter. Such physical hardware may include (but is not limited to) processors, memory, storage, network hardware, and the like. Physical hardware may be consolidated into a physical host machine, which may include one or more processors, memory, network interface card, etc. In the example illustrated, the first location 102 hosts two virtual machines 106-1 and 106-2. While two are illustrated here, it should be appreciated that the first location 102 could host a different number of virtual machines and that two are only shown for illustration purposes. The first location also hosts a software gateway 108 implemented on top of a hardware gateway 112-2. The second location 104 hosts five virtual machines 106-3, 106-4, 106-5, 106-6, and 106-7. All of the virtual machines 106-1 through 106-7 may be in the same virtual network. Thus, all of the virtual machines 106-1 through 106-7 communicate with each other and use the same gateway 108, and thus the same hardware gateway 112-2, in spite of there being a hardware gateway 112-4 at the second location, to communicate with other resources that do not use the virtual network protocol used by the virtual machines 106-1 through 106-7.

Because portions of the virtual network are in different physical locations within the network, inefficiencies may be present. For example, if any of the virtual machines 106-3 through 106-7 wishes to communicate with either of the virtual machines 106-1 or 106-2, that communication needs to be performed over some physical networking hardware that allows the physical hardware at the two different locations 104 and 102 to communicate with each other. In contrast, if virtual machine 106-3 wishes to communicate with virtual machine 106-4, less (and potentially no) physical network hardware resources need to be used as the virtual machines are in the same location. Further, if one of the virtual machines 106-3 through 106-7 wishes to communicate with external devices or with devices that do not use the virtual networking protocol, the virtual machines must communicate with the gateway 108, through the hardware gateway 112-2. Because the gateway 108 is located at the first location 102 and the virtual machines 106-3 through 106-7 are located at the second location 104, extra physical networking resources need to be used to be able to facilitate the communication between the first location 102 and the second location 104.

Embodiments can include functionality for identifying inefficiencies in a virtual networking topology and either automatically fixing inefficiencies and/or notifying a network administrator of the inefficiencies so that the network administrator can correct the inefficiencies. Alternatively or additionally, embodiments may suggest hardware upgrades or additions that would allow inefficiencies to be automatically corrected.

Illustratively, FIG. 1 illustrates an improved datacenter 100'. In the improved datacenter 100', the gateway 108 is moved to the second location 104 as a replica 108' and configured to operate with the hardware gateway 112-4. This can create a more efficient network as more virtual machines are located at the second location 104 than the first location 102 where the gateway 108 was originally placed. However, it should be appreciated that optimizations are not necessarily based simply on how many virtual machines are at a location. Rather, as will be illustrated later herein, some embodiments may be able to determine how active various virtual machines are such that it may be more efficient to move the gateway 108 to a location which may have fewer virtual machines, but where the virtual machines are particularly active in the datacenter in terms of the amount of communication to and from the virtual machines.

While FIG. 1 illustrates movement of a gateway 108 from one location to another, it should be appreciated that in alternative or additional embodiments, virtual machines may be moved to different locations. For example, FIG. 1 illustrates a further improved datacenter 100". The datacenter 100" may be a datacenter that is an improved version of the datacenter 100 with an improved topology where all of the virtual machines 106-1 through 106-7 and the gateway replica 108' are all located in the same location.

Embodiments can dynamically improve the datacenter 100 topology. In particular, as new virtual machines are added, as hardware in the datacenter changes, as usage patterns of the datacenter change, etc., embodiments can identify such changes and move virtual machines in the datacenter, move gateways in the datacenter, suggest hardware upgrades in the datacenter, identify under-utilized resources in the datacenter that could be removed or better utilized, etc. As noted, this can be done in a dynamic and ongoing fashion, such that the datacenter can continue to be improved over time depending on datacenter conditions and changes.

Various actions may be performed to perform optimization actions in a datacenter implementing one or more virtual network to improve virtual network. In particular, embodiments may (1) identify a virtual network topology; (2) identify virtual network utilization; (3) determine one or improved network topologies; and (4) optionally automatically improve the network topology. The following illustrates additional details.

As noted, embodiments include functionality for identifying a virtual network topology. Identifying a network topology can be achieved using various techniques. In particular, a datacenter 100 may include a Virtual Machine Management (VMM) component 110. The VMM components may require configuration of a network topology to be provided by a network administrators to deploy virtual machines. Using this information a network topology can be inferred.

Alternatively or additionally, embodiments may identify a network topology using standard protocols like the Simple Network Management Protocol (SNMP). Alternatively or additionally, embodiments may identify a network topology using a network manager plugin integration in the VMM component 110 to gather physical topology information from third party network management solutions.

As noted, embodiments include functionality for identifying network utilization. This can be achieved in various ways. For example, network utilization can be determined from Hypervisor hosts and their corresponding gateway connectivity can be used to infer load on the gateways. For example, network traffic can volume can be monitored at hosts to determine the amount of traffic a host may encounter. Alternatively or additionally, identifying network utilization can be performed by using standard Simple Network Management Protocols (SNMP) protocols to interact with the gateways. SNMP can be used to query network hardware to determine network volume or other characteristics, which can be used to infer gateway usage. Alternatively or additionally, identifying network utilization can be performed by using VMM plugin models to allow network devices to provide utilization information.

As noted, embodiments include functionality for determining one or improved network topologies. In some embodiments, this may be performed by identifying communication sets of virtual machines and placements of virtual gateway devices.

Embodiments may identify communication characteristics of the sets. Such communication characteristics may include, for example, intranetwork communication between virtual machines; communication through gateways to systems and devices that are external to a datacenter; communication through gateways to other areas inside datacenter.

Embodiments may determine available resources on different areas of datacenter. For example, embodiments can determine physical machines that have additional processing power available, memory available, storage available, network hardware capabilities available, etc. Some of this information may be discovered by actions performed when identifying a virtual network topology as described above. Alternatively or additionally, such information may be gathered from a hypervisor and storages devices. Such information may include CPU and storage utilization of virtual machines, and available CPU and storage on those devices.

Embodiments may use a multidimensional packing algorithm to identify an improved location for each set of virtual machines. The algorithm may take into account intra-set communications; communication through gateways within the datacenter; communication through gateways outside of the datacenter; CPU utilization of a set; storage utilization of a set; etc.

Based on the optimal configuration calculated, embodiments may improve the datacenter. For example, this may be done by using live migration to move virtual machines from physical hardware to different physical hardware. For example, as illustrated in FIG. 1, virtual machines can be moved from the hardware at the first location 102 to hardware at the second location 104. Alternatively or additionally, embodiments may reconfigure the gateway 108. Customer network information is stored in the VMM component 110. Using this information, embodiments can create a replica 108' of the gateway on the destination device. For example, FIG. 1 illustrates that a replica 108' of the gateway 108 is created at the second location 104 using the hardware gateway 112-4. In some embodiments, creating a replica of the gateway may be performed using virtual gateway functions or an additional compartment in hypervisor based gateways. The gateway information in the network virtualization stack is reconfigured to redirect the traffic flow to the new physical gateway replica 108'. Embodiments then delete the gateway configuration for network virtualization for the old gateway (e.g. gateway 108). In particular, old configuration entries can be removed from the hardware gateway 112-2.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
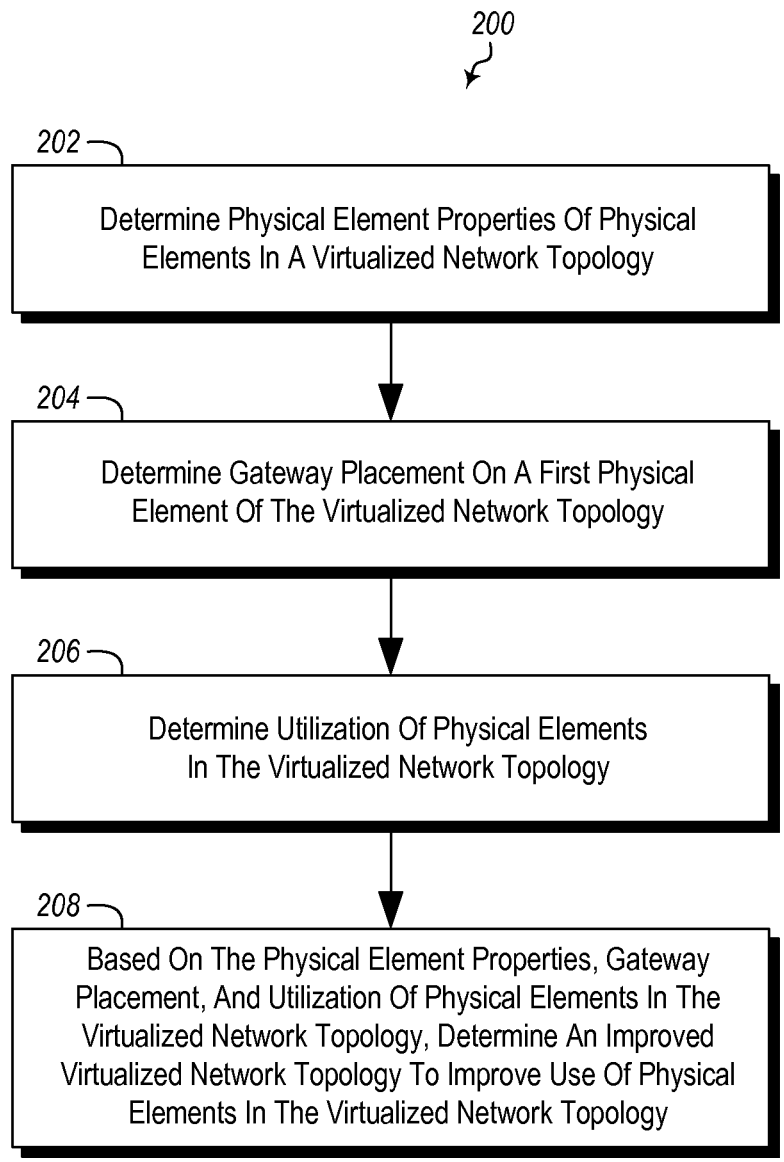
FIG. 2 illustrates a method of improving a virtualized network environment.

Referring now to FIG. 2, a method 200 is illustrated. The method 200 may be practiced in a virtualized networking environment. The method 200 includes acts for improving the network environment. The method includes determining physical element properties of physical elements in a virtualized network topology (act 202). For example, embodiments may determine processor power on physical hose machines, installed memory on physical host machines, network bandwidth of networking hardware, etc.

The method 200 may further include determining gateway placement on a first physical element of the virtualized network topology (act 204). For example, Embodiments may determine what physical machine a gateway (such as gateway 108) may be installed. In particular, In FIG. 1, the first location 102 may be a location that defines the confines of a physical machine. Thus, the gateway 108 may be located at the first location 102 as a result of being installed on the physical machine represented by the location.

The method 200 further includes determining utilization of physical elements in the virtualized network topology (act 206). For example, a determination can be made about the percentage of processor cycles being used, the amount of memory being used, network bandwidth being used, etc.

Based on the physical element properties, gateway placement, and utilization of physical elements in the virtualized network topology, the method 200 further includes determining an improved virtualized network topology to improve use of physical elements in the virtualized network topology. For example, in FIG. 1, the improved datacenters 100' and 100" illustrate improved virtualized network topologies to improve use of physical elements in the virtualized network topology represented by the datacenter 100.

The method 200 may further include, using the determined improved virtualized network topology, reconfiguring the virtualized network topology to move one or more virtual gateways from the first physical element of the virtualized network topology to a second physical element of the virtualized network topology. For example, as illustrated in FIG. 1, the gateway 108 is moved from hardware at the first location 102 to hardware at the second location 104.

In some such embodiments, reconfiguring the virtualized network topology to move one or more virtual gateways from the first physical element of the virtualized network topology to a second physical element of the virtualized network topology includes: creating a replica of a gateway; deploying the replica of the gateway at the second physical element of the virtualized network topology; routing virtualized network traffic flow to the replica of the gateway; and deleting gateway configuration information associated with the first physical element for the gateway. FIG. 1 illustrates an example of this where the replica 108' is deployed at the second location 104. The replica 108 can then be removed from the first location 102.

Embodiments of the method may further include moving one or more virtual machines in the virtualized network topology to the second physical element. For example, as illustrated in FIG. 1, Virtual machines 106-1 and 106-2 can be moved to physical hardware at the second location 104.

The method 200 may further include identifying additional physical resources needed to implement the improved virtualized network topology, and indicating those resources to a user to allow the user to add additional resources to implement the improved virtualized network topology. For example, rather than moving gateways or virtual machines, embodiments may provide an indication to a user of what hardware could be added to a topology so that the topology could be improved. For example, the VMM 110 may provide an alert to a user that more memory could be added at a physical machine, that networking hardware could be updated, etc. Alternatively or additionally, the method 200 may further include identifying under-utilized physical resources in the virtualized network topology and providing an indication of the under-utilized physical resources. For example, embodiment may report resource constraints or overprovisioning in a particular dimension (Network, CPU or Storage) if one or more dimension blocks additional virtual machine deployment in that part of datacenter while other dimensions have utilization below certain thresholds in other dimensions.

Further, the methods may be practiced by a computer system including one or more processors and computer readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, and the like which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for determining a new configuration of a virtualized network topology, the method comprising:
    identifying an existing configuration of a virtualized network topology that includes a plurality of physical elements, a plurality of virtual machines, and a gateway that is located on a first physical element included within the plurality of physical elements,
        wherein a second physical element that is included within the plurality of physical elements hosts both a first virtual machine and a second virtual machine, and
        wherein the identification of the existing configuration includes identifying a location of the gateway on the first physical element;
    identifying one or more properties of each of the physical elements;
    identifying how each of the physical elements is being utilized in the existing configuration, wherein the identification of how each of the physical elements is being utilized in the existing configuration includes:
        monitoring an activity level of the first physical element to detect a performance condition where the activity level of the first physical element is determined to be below a performance threshold such that the first physical element is determined to be under-utilized, and
        identifying communication characteristics arising from a detected communication between the first virtual machine and the second virtual machine;
    based on the identified physical element properties, the identified gateway location, the communication characteristics, and the identified utilization of the physical elements, determining, by the one or more processors, a new configuration for the virtualized network topology that is different than the existing configuration and that will later replace the existing configuration, wherein, after the new configuration replaces the existing configuration, the activity level of the first physical element will be above the performance threshold such that the first physical element will no longer be determined to be under-utilized;
    subsequent to determining the new configuration, identifying, by the one or more processors, additional physical resources needed to implement the new configuration; and
    indicating the additional physical resources needed to a user to allow the user to add the additional physical resources to implement the new configuration.

2. The method of claim 1, wherein the gateway is a virtual gateway, and wherein, when the new configuration replaces the existing configuration, the virtual gateway is moved from the first physical element to a different physical element.

3. The method of claim 2, wherein moving the virtual gateway from the first physical element to the different physical element comprises:
    creating a replica of the virtual gateway;
    deploying the replica of the virtual gateway to the different physical element;
    routing virtualized network traffic flow to the replica of the virtual gateway; and
    deleting gateway configuration information associated with the first physical element for the virtual gateway.

4. The method of claim 2, further comprising moving the first virtual machine and the second virtual machine from the first physical element to the different physical element.

5. The method of claim 1, wherein identifying additional physical resources needed to implement the new configuration and indicating the needed additional physical resources to the user to allow the user to add the additional physical resources to implement the new configuration further comprises identifying additional physical resources that are not present in the existing configuration and indicating to the user the additional physical resources that are not present in the existing configuration, but that are needed to implement the new configuration.

6. The method of claim 1, further comprising providing an indication to the user that the first physical element is determined to be under-utilized.

7. The method of claim 1, wherein the identification of the one or more properties of each of the physical elements is performed using a plug-in at a virtual machine management component that functions with $3^{rd}$ party network management solutions to discover a network topology.

8. The method of claim 1, wherein identifying how each of the physical elements is being utilized in the existing configuration is performed using a plug-in at a virtual machine management component that interacts with physical network devices which provide network utilization information to the virtual machine management component.

9. The method of claim 1, wherein the new configuration provides improved communication characteristics between the first virtual machine and the second virtual machine.

10. A computer system, comprising:
    one or more processors; and
    one or more computer readable media having stored thereon computer-executable instructions that are executable by the one or more processors to cause the computer system to determine a new configuration for a virtualized network topology by causing the computer system to perform the following:
        identify an existing configuration of a virtualized network topology that includes a plurality of physical elements, a plurality of virtual machines, and a gateway that is located on a first physical element included within the plurality of physical elements,
            wherein a second physical element that is included within the plurality of physical elements hosts both a first virtual machine and a second virtual machine, and
            wherein the identification of the existing configuration includes identifying a location of the gateway on the first physical element;
        identify one or more properties of each of the physical elements;
        identify how each of the physical elements is being utilized in the existing configuration, wherein the identification of how each of the physical elements is being utilized in the existing configuration includes:
            monitoring an activity level of the first physical element to detect a performance condition where the activity level of the first physical element is determined to be under-utilized, and
            identifying communication characteristics arising from a detected communication between the first virtual machine and the second virtual machine;
        based on the identified physical element properties, the identified gateway location, the communication characteristics, and the identified utilization of the physical elements, determine, by the one or more processors, a new configuration for the virtualized network topology that is different than the existing configuration and that will later replace the existing configuration, wherein, after the new configuration replaces the existing configuration, the activity level of the first physical element will be above a performance threshold such that the first physical element will no longer be determined to be under-utilized;

subsequent to determining the new configuration, identify, by the one or more processors, additional physical resources that are not present in the existing configuration but that are needed to implement the new configuration; and indicate to a user the additional physical resources not present in the existing configuration but that are needed to allow the user to add the additional physical resources to implement the new configuration.

11. The computer system of claim 10, wherein the gateway is a virtual gateway, and wherein, when the new configuration replaces the existing configuration, the virtual gateway is moved from the first physical element to a different physical element.

12. The computer system of claim 11, wherein moving the virtual gateway from the first physical element to the different physical element comprises:
creating a replica of the virtual gateway;
deploying the replica of the virtual gateway to the different physical element;
routing virtualized network traffic flow to the replica of the virtual gateway; and
deleting gateway configuration information associated with the first physical element for the virtual gateway.

13. The computer system of claim 11, wherein the computer-executable instructions further cause the computer system to move the first virtual machine and the second virtual machine to the different physical element.

14. The computer system of claim 10, wherein the monitored activity level is at least partially based on a percentage of processor cycles the first physical element is using.

15. The computer system of claim 10, wherein the computer-executable instructions further cause the computer system to provide an indication to the user that the first physical element is determined to be under-utilized.

16. The computer system of claim 10, wherein the identification of the one or more properties of each of the physical elements is performed using a plug-in at a virtual machine management component that functions with $3^{rd}$ party network management solutions to discover a network topology.

17. The computer system of claim 10, wherein identifying how each of the physical elements is being utilized in the existing configuration is performed using a plug-in at a virtual machine management component that interacts with physical network devices which provide network utilization information to the virtual machine management component.

18. One or more hardware storage devices having thereon computer-executable instructions that are executable by one or more processors of a computing system to cause the computing system to determine a new configuration for a virtualized network topology by causing the computer system to:
identify an existing configuration of a virtualized network topology that includes a plurality of physical elements, a plurality of virtual machines, and a gateway that is located on a first physical element included within the plurality of physical elements,
wherein a second physical element that is included within the plurality of physical elements hosts both a first virtual machine and a second virtual machine, and
wherein the identification of the existing configuration includes identifying a location of the gateway on the first physical element;
identify one or more properties of each of the physical elements;
identify how each of the physical elements is being utilized in the existing configuration, wherein the identification of how each of the physical elements is being utilized in the existing configuration includes:
monitoring an activity level of the first physical element to detect a performance condition where the activity level of the first physical element is determined to be under-utilized, and
identifying communication characteristics arising from a detected communication between the first virtual machine and the second virtual machine;
based on the identified physical element properties, the identified gateway location, the communication characteristics and the identified utilization of the physical elements, determine, by the one or more processors, a new configuration for the virtualized network topology that is different than the existing configuration and that will later replace the existing configuration, wherein, after the new configuration replaces the existing configuration, the activity level of the first physical element will be above a performance threshold such that the first physical element will no longer be determined to be under-utilized;
subsequent to determining the new configuration, identify, by the one or more processors, additional physical resources that are not present in the existing configuration but that are needed to implement the new configuration; and
indicate to a user the additional physical resources not present in the existing configuration but that are needed to allow the user to add the additional physical resources to implement the new configuration.

19. The one or more hardware storage devices of claim 18, wherein a condition that causes the computer system to begin the determination of the new configuration for the virtualized network topology includes identifying that a change is to be made to hardware components that form a part of the virtualized network topology.

20. The one or more hardware storage devices of claim 18, wherein a condition that causes the computer system to begin the determination of the new configuration for the virtualized network topology includes identifying a change in a usage pattern of the virtualized network topology.

21. The one or more hardware storage devices of claim 18, wherein a condition that causes the computer system to begin the determination of the new configuration for the virtualized network topology includes identifying that a new virtual machine is to be added to the virtualized network topology.

* * * * *